United States Patent
Hämäläinen et al.

(10) Patent No.: US 11,376,546 B2
(45) Date of Patent: Jul. 5, 2022

(54) METHOD AND A SYSTEM FOR PRODUCING HYDROCHLORIC ACID FROM FLUE GASES

(71) Applicant: Valmet Technologies Oy, Espoo (FI)

(72) Inventors: Risto Hämäläinen, Tampere (FI); Tarja Korhonen, Tampere (FI); Naveen Chenna, Tampere (FI); Lauri Kokko, Tampere (FI)

(73) Assignee: VALMET TECHNOLOGIES OY, Espoo (FI)

( * ) Notice: Subject to any disclaimer, the term of this patent is extended or adjusted under 35 U.S.C. 154(b) by 0 days.

(21) Appl. No.: 17/273,640

(22) PCT Filed: Sep. 24, 2019

(86) PCT No.: PCT/FI2019/050684
§ 371 (c)(1),
(2) Date: Mar. 4, 2021

(87) PCT Pub. No.: WO2020/065131
PCT Pub. Date: Apr. 2, 2020

(65) Prior Publication Data
US 2021/0354076 A1    Nov. 18, 2021

(30) Foreign Application Priority Data
Sep. 24, 2018   (FI) ..................... 20185795

(51) Int. Cl.
| | | |
|---|---|---|
| *F23J 15/04* | (2006.01) | |
| *C01B 7/07* | (2006.01) | |
| *C01B 7/03* | (2006.01) | |
| *B01J 8/00* | (2006.01) | |
| *B01D 53/86* | (2006.01) | |
| *B01D 53/14* | (2006.01) | |

(52) U.S. Cl.
CPC ..... B01D 53/1418 (2013.01); B01D 53/1406 (2013.01); B01D 53/1456 (2013.01); B01D 53/1481 (2013.01); B01D 53/8625 (2013.01); B01J 8/005 (2013.01); C01B 7/035 (2013.01); C01B 7/0737 (2013.01); F23J 15/04 (2013.01); *B01D 2252/103* (2013.01); *B01J 2208/00106* (2013.01); *B01J 2208/00504* (2013.01); *F23J 2215/30* (2013.01)

(58) Field of Classification Search
CPC ........ F23J 15/04; F23J 2215/30; B01D 53/68; B01D 53/1418; B01D 2252/103; B01D 2258/0283; B01D 2257/2045; B01D 53/8625; B01D 53/1481; B01D 53/1456; B01D 53/1406; B01J 2208/00504; B01J 8/005; B01J 2208/00106; C01B 7/0706; C01B 2203/1614; C01B 7/0737; C01B 7/035
See application file for complete search history.

(56) References Cited

U.S. PATENT DOCUMENTS

| | | | |
|---|---|---|---|
| 3,807,139 A | | 4/1974 | Di Fiore et al. |
| 3,885,929 A | * | 5/1975 | Lyon ..................... B01D 53/68 |
| | | | 95/224 |
| 5,582,634 A | | 12/1996 | Burdis |
| 2009/0208395 A1 | | 8/2009 | Hunsinger |
| 2012/0237423 A1 | | 9/2012 | Bialkin |

FOREIGN PATENT DOCUMENTS

| | | | | |
|---|---|---|---|---|
| CN | 203725006 U | | 7/2014 | |
| CN | 107961645 A | | 4/2018 | |
| EP | 3238810 A1 | | 11/2017 | |
| FR | 2 089 429 A5 | * | 1/1972 | ............. B01D 53/18 |
| GB | 740 252 A | * | 1/1953 | ............... C01B 7/01 |
| GB | 780984 A | | 8/1957 | |

(Continued)

OTHER PUBLICATIONS

Finnish Office Action for U.S. Appl. No. 20/185,795, dated Mar. 12, 2019, (7 pages), Finnish Patent and Registration Office, Helsinki, Finland.

International Searching Authority, International Search Report and Written Opinion for International Application No. PCT/FI2019/050684, dated Jan. 3, 2020, (12 pages), European Patent Office, Rijswijk, Netherlands.

International Preliminary Examining Authority, Second Written Opinion for International Application No. PCT/FI2019/050684, dated Sep. 10, 2020, (7 pages), European Patent Office, Rijswijk, Netherlands.

(Continued)

*Primary Examiner* — Timothy C Vanoy
(74) *Attorney, Agent, or Firm* — Alston & Bird LLP

(57) ABSTRACT

A method for producing aqueous hydrochloric acid from flue gases is provided. The method comprises conveying water to a first scrubber (102, 202, 302, 402, 502, 602, 702) or to a line (112*b*, 212*b*, 312*b*, 412*b*, 512*b*, 712*b*, 712*c*) to use the water in a scrubbing liquid of the first scrubber. The method also comprises providing flue gas containing chlorides into the first scrubber (102, 202, 302, 402, 502, 602, 702) and scrubbing the flue gas containing chlorides with the scrubbing liquid by contacting the flue gas with the scrubbing liquid in the first scrubber (102, 202, 302, 402, 502, 602, 702). Dilute hydrochloric acid and a flue gas derivate (104, 204, 304, 404, 504, 704) are produced. The method comprises letting out at least some of the dilute hydrochloric acid from the first scrubber (102, 202, 302, 402, 502, 602, 702) as a scrubber bleed, separating solids suspended by the scrubber bleed in a solids separator (192, 592, 692), conveying the scrubber bleed from the solids separator (192, 592, 692) into an evaporation vessel (194, 594, 694) and concentrating the scrubber bleed in the evaporation vessel (194, 594, 694) to produce hydrochloric acid vapor having a concentration of 5-22 wt-%. A corresponding system is also provided.

20 Claims, 6 Drawing Sheets

(56) References Cited

FOREIGN PATENT DOCUMENTS

WO      WO 01 25 143 A1 *   4/2001   ......... B01D 53/1456

OTHER PUBLICATIONS

International Preliminary Examining Authority, International Preliminary Report on Patentability for International Application No. PCT/FI2019/050684, dated Jan. 13, 2021, (20 pages), European Patent Office, Rijswijk, Netherlands.

* cited by examiner

METHOD AND A SYSTEM FOR PRODUCING HYDROCHLORIC ACID FROM FLUE GASES

CROSS REFERENCE TO RELATED APPLICATIONS

This application is a National Stage Application, filed under 35 U.S.C. § 371, of International Application No. PCT/FI2019/050684, filed Sep. 24, 2019, which international application claims priority to and the benefit of Finland Application No. 20185795, filed Sep. 24, 2018; the contents of both of which as are hereby incorporated by reference in their entireties.

BACKGROUND

Related Field

This specification relates to a method and a system for producing hydrochloric acid from flue gases. Some aspects of the specification relate to a method and a system for producing aqueous hydrochloric acid from flue gases containing chlorides.

Description of Related Art

Power plant flue gases contain several pollutants, such as sulphur dioxide, nitrogen oxides, heavy metals, dust and chlorides. Chlorides are present especially in flue gases originating from burning of coal and are harmful to the environment when being absorbed to water and expelled to nature. Emissions of chloride from coal-fired plants may range from 50 to several thousand parts per million by volume, depending on the original concentration in the coal, the type of combustor, and the pollution control equipment installed.

Flue gas cleaning systems are required to decrease the release of the pollutants to environment. The flue gas cleaning systems may be divided into dry, semi-dry and wet cleaning systems. A single flue gas cleaning system may not be capable of removing all pollutants effectively.

Sulphur dioxide of flue gas may be removed by a wet scrubbing system. One of the main concerns relating to the removal of sulphur dioxide by the wet scrubbing system is that hydrochloric acid is absorbed along with sulphur dioxide, which lowers the pH of the absorption stage and eventually affects the sulphur dioxide absorption.

Another problem relating to the wet scrubbing of sulphur dioxide and hydrochloric acid is that the scrubber process waters are nowadays taken to rivers and local water bodies, thus increasing the salinization, which is a big ecological and environmental threat.

BRIEF SUMMARY

A method for producing aqueous hydrochloric acid from flue gases is disclosed. The method allows for removal of chlorides from the flue gases in such a way, that hydrochloric acid vapor for use as such may be obtained from the scrubber process water. Directing the scrubber process waters to rivers and other water bodies, thus increasing the salinization, is no more an option, as the process waters possess intrinsic economical value. Moreover, the method allows for more efficient sulphur removal from the flue gases, as the chlorides contained by the flue gases are removed in a preceding process, and thus are not affecting the sulphur dioxide absorption. A corresponding system is also disclosed.

A method for producing aqueous hydrochloric acid from flue gases is provided. The method comprises
- conveying water to a first scrubber or to a line to use the water in a scrubbing liquid of the first scrubber,
- providing flue gas containing chlorides into the first scrubber,
- scrubbing the flue gas containing chlorides with the scrubbing liquid by contacting the flue gas with the scrubbing liquid in the first scrubber, thereby producing dilute hydrochloric acid and a flue gas derivate,
- letting out at least some of the dilute hydrochloric acid from the first scrubber as a scrubber bleed,
- separating solids suspended by the scrubber bleed in a solids separator,
- conveying the scrubber bleed from the solids separator into an evaporation vessel and
- concentrating the scrubber bleed in the evaporation vessel to produce hydrochloric acid vapor having a concentration of 5-22 wt-%.

A system arranged to produce aqueous hydrochloric acid from flue gases is provided. The system comprises
- a first conduit configured to feed flue gas containing chlorides into a first scrubber,
- a second conduit configured to convey water to be used in a scrubbing liquid of the first scrubber,
- a line configured to convey scrubbing liquid comprising the water into the first scrubber and
- a first line for expelling dilute hydrochloric acid as a scrubber bleed from the first scrubber, wherein
the first scrubber is configured to scrub the flue gas containing chlorides with the scrubbing liquid, the first scrubber thereby being configured to produce the scrubber bleed and a flue gas derivate, and the system further comprises
- a solids separator for separating solids suspended by the scrubber bleed,
- an evaporation vessel, and
- a second line for conveying the scrubber bleed from the solids separator into the evaporation vessel,
the evaporation vessel being configured to concentrate the scrubber bleed to produce hydrochloric acid vapor having a concentration of 5-22 wt-%.

The figures are schematic. The figures are not in any particular scale.

DETAILED DESCRIPTION OF VARIOUS EMBODIMENTS

The solution is described in the following in more detail with reference to some embodiments, which shall not be regarded as limiting.

Figure 1A:
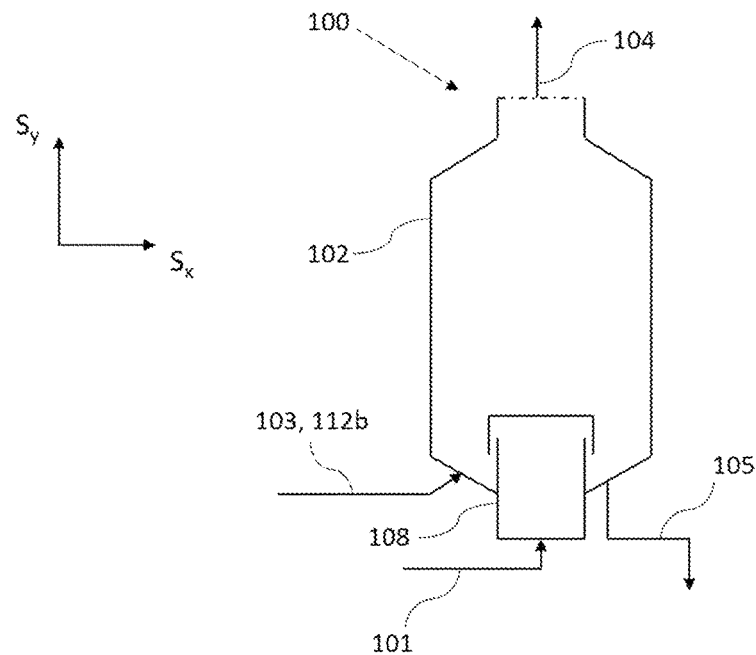
FIG. 1a illustrates, by way of an example, a process diagram of a system 100 configured to produce aqueous hydrochloric acid from flue gases without solids separation and pre-concentration.

In the following description, reference is made to the figures with the following numerals and denotations:
$S_x$ and $S_y$ denote orthogonal directions. In a typical use, $S_y$ is vertical and upwards.
100 System
101 First conduit
102 First scrubber
103 Second conduit
104 Flue gas derivate
105 First line
108 Connection
110 Pump
111 Line
112b Line, i.e. pipe
192 Solids separator
193 Second line
194 Evaporation vessel
195 Line
196 Separated solids
197 Heater
198 Excess water
199 Contaminant concentrate
201 First conduit
202 First scrubber
203 Second conduit
204 Flue gas derivate
205 First line
206 Nozzle
207 Packed bed column
208 Connection
210 Pump
211 Line
212 Line
212b Line
300 System
301 First conduit
302 First scrubber
303 Second conduit
304 Flue gas derivate
305 First line
306 Nozzle
307 Packed bed column
308 Connection
310 First pump
311 Line
312 Line
312b Line
313 Second scrubber
314 Line
315 Packed bed column
316 Nozzle
317 Connection
318 Line
319 Second flue gas derivate
320 Second pump
321 Line
322 Line
401 First conduit
402 First scrubber
403 Second conduit
404 Flue gas derivate
405 First line
406 Nozzle
407 Packed bed column
408 Connection
410 Pump
411 Line
412 Line
412b Line
430 First sensor
431 First valve
432 First processor
433 Second sensor
434 Second valve
435 Second processor
500 System
501 First conduit
502 First scrubber
503 Second conduit
504 Flue gas derivate
505 First line
506 Nozzle
507 Packed bed column
508 Connection
510 Pump
511 Line
512 Line
512b Line
540 Concentrator
592 Solids separator
593 Second line
594 Evaporation vessel
595 Line
600 System
601 First conduit
602 First scrubber
650 Fuel
651 Boiler
652 Catalytic reduction reactor
653 Heat exchanger
654 Particle separating unit
661 Steam turbine 662 Generator
692 Solids separator
694 Evaporation vessel
701 First conduit
702 First scrubber
703 Second conduit
703b Line
704 Flue gas derivate
705 First line
706 Nozzle
707a First washing stage
707b Second washing stage
708 Connection
710 Pump
710b Second pump
711 Line
712 Line
712b Line
712c Line FIG. 1a shows a system 100 for producing aqueous hydrochloric acid from flue gases. The system 100 is connected to a source, such as a boiler, configured to produce flue gas containing chlorides by oxidation, such as burning, of some material. The system 100 comprises a first scrubber 102. The first scrubber 102 is configured to receive the flue gas containing chlorides and water. A first conduit 101 configured to feed the flue gas containing chlorides into the first scrubber 102 is shown in the figure. The system 100 also comprises a second conduit 103 configured to feed water into the first scrubber 102. In the embodiment of FIG. 1a, the second conduit 103 is also a line 112b, i.e. a pipe 112b, configured to convey the water into the first scrubber 102. In FIG. 1a, the scrubbing liquid that is conveyed to the first scrubber 102 consists of the water (and thus, the scrubbing liquid comprises the water). However, the scrubbing liquid within the first scrubber 102 comprises water. The first scrubber 102 is configured to scrub the flue gas containing chlorides with scrubbing liquid. The first scrubber 102 is configured to produce dilute hydrochloric acid and a flue gas derivate 104. A first line 105 is provided for conveying at least some of the dilute hydrochloric acid from the first scrubber 102 as a scrubber bleed.

Figure 1B:
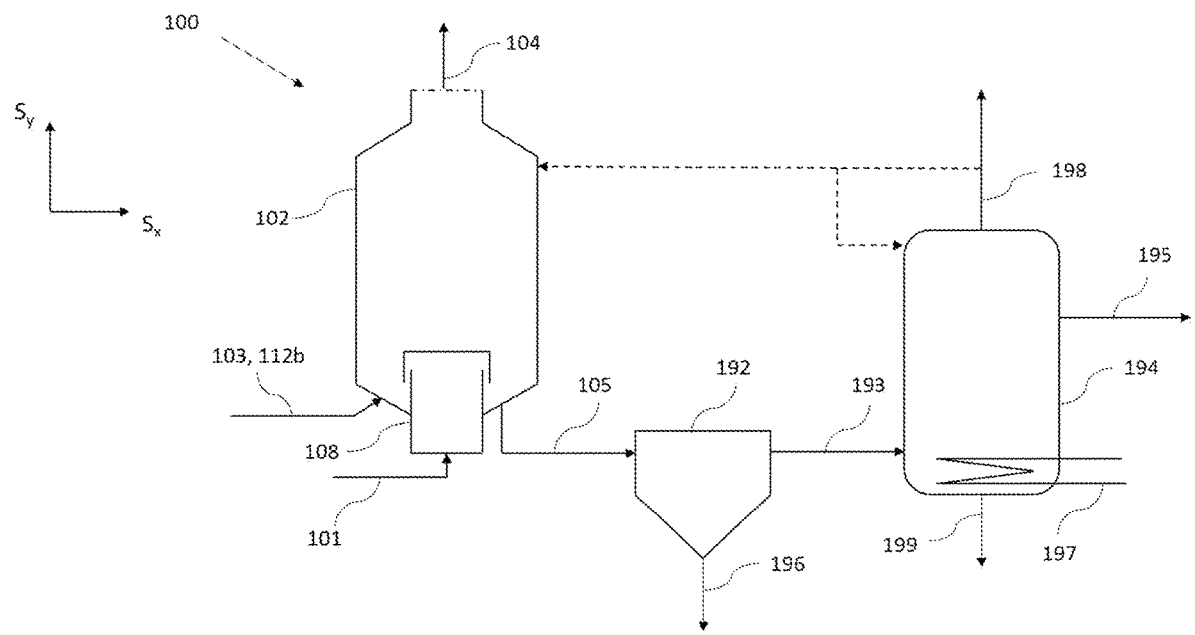
FIG. 1b illustrates, by way of an example, a process diagram of a system 100 configured to produce aqueous hydrochloric acid from flue gases.

As illustrated by FIG. 1b, the system 100 further comprises a solids separator 192 configured to separate solids suspended by the scrubber bleed. The first line 105 is arranged to feed the scrubber bleed from the first scrubber 102 into the solids separator 192. The system 100 further comprises an evaporation vessel 194 configured to concentrate the scrubber bleed from which the solids have been separated to produce hydrochloric acid vapor having a concentration of 5-22 wt-%, for example of 15-22 wt-%. The system 100 further comprises a second line 193 configured to convey the scrubber bleed from the solids separator 192 into the evaporation vessel 194.

In the process, the water fed into the first scrubber 102 or into a line 112b configured to convey scrubbing solution to the first scrubber 102 is substantially pure water, namely at least fresh water. The water may for example consist of water obtained from a fresh water source. The water may be fed into the first scrubber as in FIGS. 1a-c, or it may be fed to a line 212b as in FIG. 2. The water obtained from a fresh water source may be purified, for example filtered. Alternatively, the water fed into the first scrubber may be for example tap water or make-up water of the boiler, which (both) are typically also in some way purified before use. The term fresh water throughout this description refers to water with a sodium chloride (NaCl) content of less than 1 wt-%. In an embodiment, the water comprises at most 1 wt-% impurities (including salt, particulate impurities etc.).

In the process, the scrubbing liquid is aqueous hydrochloric acid or water, and scrubbing the flue gas by the scrubbing liquid strengthens the scrubbing liquid to form the dilute hydrochloric acid. This means that the concentration of the scrubbing liquid in terms of the hydrochloric acid increases. The scrubbing liquid absorbs from the flue gas the hydrochloric acid, and may absorb also some impurities (namely compounds other than water or HCl). Thus, the concentration of impurities of the scrubbing liquid may be higher than the concentration of impurities of the water. When the concentration of HCl is at sufficient level, hydrochloric acid may be taken out of the process, and water may be added to the scrubbing liquid to lower the concentration or to prevent the concentration from rising too high.

A first scrubber according to this disclosure may comprise nozzles (e.g. 206, 306) configured to spray the scrubbing liquid onto the gas containing chlorides. The scrubber may comprise a contact area configured to improve contact between the gas and the liquid sprayed onto the gas. The contact area may also be called a washing stage. The contact area may comprise for example a packed bed column. The packed bed column is filled with a packing material. The packed bed column may be randomly filled with the packing material or it may comprise a structured packing. The first scrubber may be 7-16 metres in diameter, in $S_x$-direction. A shell of the first scrubber may comprise carbon steel. An inner lining of the shell of the first scrubber may comprise a resin-lining in order to protect the inner lining from corrosion.

Figure 7:
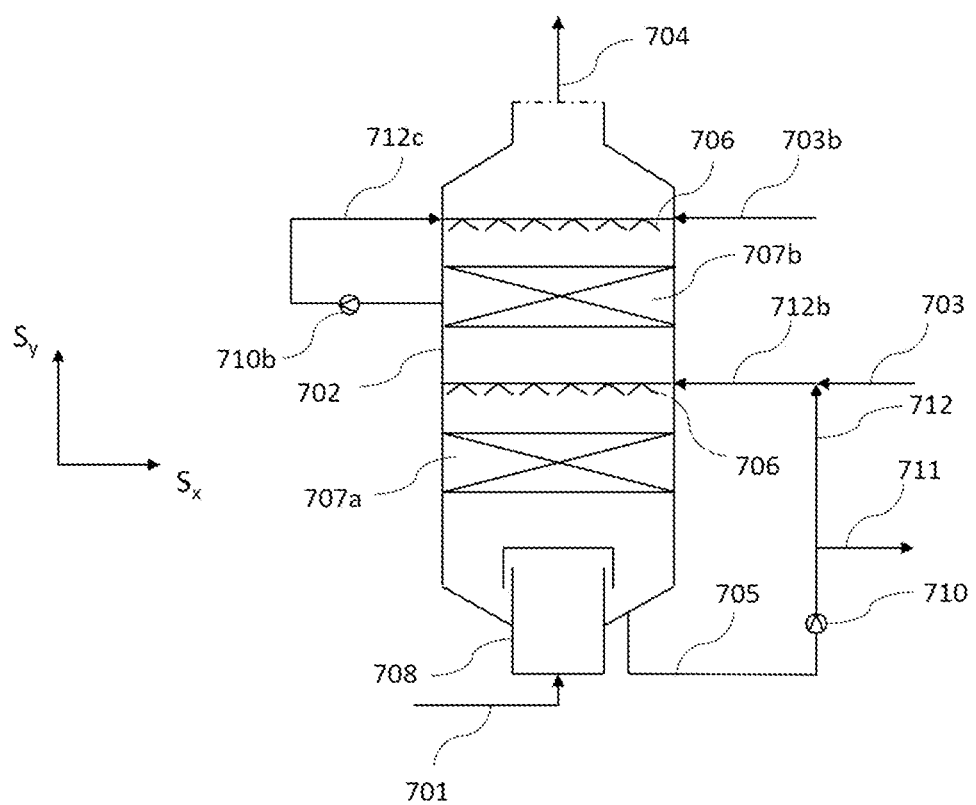
FIG. 7 illustrates, by way of an example, a process diagram of a first scrubber of a system configured to produce aqueous hydrochloric acid from flue gases.

According to an embodiment, the first scrubber is a multistage scrubber. FIG. 7 illustrates, by way of an example, a multistage scrubber. The multistage scrubber comprises at least two washing stages. The first scrubber 702 comprises a first washing stage 707a and a second washing stage 707b, as illustrated. The washing stages may be comprised of a single vessel (as illustrated) or the washing stages may be separate vessels. The washing stages may be separated by a tray bottom. Herein the order of washing stages is such that the first washing stage is arranged upstream from all other washing stages in the direction of flow of the flue gas. In the first washing stage 707a, the flue gas comprising chlorides contacts a first scrubbing liquid of the first washing stage to scrub the flue gas comprising chlorides. In the second washing stage 707b, the flue gas comprising chlorides, which is received from the first washing stage 707a, contacts a second scrubbing liquid of the second washing stage to further scrub the flue gas comprising chlorides. The partially scrubbed flue gas is conveyed from the first washing stage to the second washing stage. The first washing stage into which the flue gas enters, i.e. the first washing stage 707a may have a higher concentration in terms of HCl than the following stage(s) in the direction of flow of the flue gas, in particular the second washing stage. Thus in an embodiment, the first scrubbing liquid has a first content of hydrochloric acid, the second scrubbing liquid has a second content of hydrochloric acid, and the first content of hydrochloric acid is greater than the second content of hydrochloric acid.

Bleed resulting from at least the first washing stage 707a is collected at the first washing stage 707a. Bleed resulting from each washing stage may be collected at the first washing stage 707a. Fresh scrubbing liquid, namely water, may be added to any of the washing stages. By adding the fresh scrubbing liquid at least to the last washing stage in direction of flow of the flue gas and taking the scrubber bleed out of the scrubber from the first washing stage 707a the first scrubber 702 may be used as a counterflow concentrator for producing aqueous HCl-solution. As the flue gas containing chlorides is scrubbed in at least two washing stages, the flue gas derivate 704 exiting the first scrubber 702 may be cleaner in terms of chloride content when compared to the flue gas derivate of a first scrubber having a single washing stage.

The first scrubber 702 is connected to a source, such as a boiler, configured to produce flue gas containing chlorides by oxidation, such as burning, of some material. The first scrubber 702 is configured to receive the flue gas containing chlorides and water. A first conduit 701 configured to feed the flue gas containing chlorides into the first scrubber 702 is shown in the FIG. 7. A second conduit 703 is configured to feed water or scrubbing liquid into the first washing stage 707a. As illustrated in FIG. 7, the second conduit 703 may also be a line 712b, i.e. a pipe 712b, configured to convey the water or the scrubbing liquid into the first washing stage 707a as part of scrubbing liquid circulating in the first washing stage. For example, excess second scrubbing liquid from the second washing stage 707b may be fed to the first washing stage 707a through the line 703. Nozzles 706 are configured to spray the scrubbing liquid onto the flue gas containing chlorides. The first washing stage 707a is configured to scrub the flue gas containing chlorides with scrubbing liquid, i.e. first scrubbing liquid. The first washing stage 707a is configured to produce dilute hydrochloric acid and a flue gas derivate 704. A first line 705 is provided for conveying at least some of the dilute hydrochloric acid from the first scrubber 702, in particular from the first washing stage 707a, as a scrubber bleed.

The first scrubber 702 comprises a pump 710 arranged to pump some of the dilute hydrochloric acid from the first washing stage 707a via lines 712 and 712b back into the first washing stage 707a. The pump 710 is arranged to pump the remaining portion of the dilute hydrochloric acid via line 711 for further use, for example into a storage tank and/or into a solids separator.

Additionally or alternatively, another storage tank (not shown) may be arranged in between the pump 710 and the first scrubber 702, at least if the first scrubber 702 does not act as a storage for the circulated first scrubbing liquid. Moreover, a first line 705 may serve as the other storage tank.

As illustrated by FIG. 7, the first scrubber 702 comprises a line 703b configured to feed water (or scrubbing liquid) into the second washing stage 707b. Nozzles 706 are configured to spray the scrubbing liquid, i.e. second scrubbing liquid, onto the flue gas containing chlorides. As illustrated, the first scrubber 702 may comprise means for circulating the second scrubbing liquid within the second washing stage 707b. The first scrubber 702 may comprise a second pump 710b configured to pump at least some of the second scrubbing liquid from the second washing stage 707b via line 712c to be used again in the second washing stage 707b. As indicated above, in a multistage scrubber, water is preferably fed at least to a last washing stage, to be used as part of a scrubbing liquid of the last washing stage. The term last washing stage refers to such a washing stage that the last washing stage is arranged downstream from all other washing stages in the direction of flow of the flue gas. For example, in FIG. 7, the second was stage 707b is also the last washing stage, whereby, preferably, water is fed through the line 703b to be used as part of the second scrubbing liquid.

It is also explicitly noted that a two-stage scrubber, or a multistage scrubber, may be used as the first scrubber of any embodiment, in particular as the first scrubber of any one of the FIGS. 1a, 1b, 1c, 2, 3, 4, 5a, 5b, 6a, and 6b.

In this description, the term "dilute hydrochloric acid" refers to an aqueous solution of hydrochloric acid (HCl), wherein the content of hydrochloric acid is at most 20 wt-%. As discussed below, in a typical process, the concentration of the dilute hydrochloric acid is between 10-20 wt-%.

The flue gas refers to a combustion exhaust gas produced in a furnace, for example a furnace of a power plant. The composition of the flue gas depends on what is being burned. Typically, the flue gas comprises nitrogen, carbon dioxide, water vapor, and oxygen. It further contains a number of pollutants, such as particulate matter, carbon monoxide, nitrogen oxides and sulphur oxides. Especially fossil fuels, particularly coal, also comprise chlorine. The amount of chlorine in coal may range from ppm-scale to even percent-scale. The flue gas containing chlorides refers to a combustion exhaust gas that is produced by burning chlorine-containing fuel. Within context of this disclosure, the flue gas containing chlorides is produced by burning fuel. The fuel may comprise at least one of the following: biomass, coal, and waste.

With reference to FIG. 1a in a corresponding method according to an embodiment, the flue gas containing chlorides is provided into the first scrubber 102 via the first conduit 101 and a connection 108. Water is conveyed to the first scrubber 102 via the second conduit 103. The water conveyed to the first scrubber 102 is used in a scrubbing liquid in the first scrubber 102. The flue gas containing chlorides is scrubbed with the scrubbing liquid by contacting the flue gas with the scrubbing liquid in the first scrubber 102. The contacting of the flue gas and the scrubbing liquid preferably takes place in the contact area of the first scrubber 102. The contact area may be for example a packed bed column. Alternatively, the flue gas may be contacted with scrubbing liquid without a packed bed column, for example in a bath of a scrubbing liquid, through which the flue gas runs, or by spraying the scrubbing liquid onto a flow of flue gas. When contacted with the scrubbing liquid, at least some of the chlorides contained by the flue gas are transferred into the scrubbing liquid. Thus, dilute hydrochloric acid is produced. At least some of the dilute hydrochloric acid is let out from the first scrubber 102 as a scrubber bleed. The dilute hydrochloric acid may be let out via first line 105 for example into a storage tank. Referring to FIG. 1b, additionally or alternatively, the scrubber bleed may be conveyed via first line 105 into a solids separator 192. It is also possible that the scrubber bleed is conveyed from the storage tank into a solids separator 192. Alternatively, the storage tank may be used as a solids separator. The storage tank may be for example a gravity settling vessel. A concentration of the dilute hydrochloric acid in the first scrubber 102 may be maintained at a concentration of at most 20 wt-%. The scrubber bleed let out from the first scrubber 102 may have a concentration of from 3 to 20 wt-%. The concentration of the dilute hydrochloric acid is maintained by controlling the amount of dilute hydrochloric acid expelled from the first scrubber 102. For example, a bath of dilute hydrochloric acid may be formed on the bottom of the first scrubber 102, and the flue gas containing chlorides may be conveyed through the bath. The flue gas from which at least some of the chlorides are transferred into the scrubbing liquid, referred to as a flue gas derivate 104, is directed out of the first scrubber 102. The flue gas derivate 104 may contain for example oxides of sulphur.

Solids suspended by the scrubber bleed are separated in the solids separator 192. Thus, a scrubber bleed from which the solids have been separated is formed. Further, separated solids 196 are formed and may be expelled from the solids separator 192. Solids separator 192 may be based for example on centrifugal separation, gravity settling or filtering. The system may comprise more than one solids separators in a series. The scrubber bleed from which the solids have been separated is conveyed via a second line 193 into an evaporation vessel 194.

The scrubber bleed from which the solids have been separated is concentrated in the evaporation vessel 194 to produce hydrochloric acid vapor having a concentration of 5-22 wt-%, for example of 15-22 wt-%. This may be called a pre-concentration process. In the evaporation vessel 194 the scrubber bleed from which the solids have been separated is brought to a boiling state. This may be performed by adjusting the temperature and/or pressure. As illustrated by FIG. 1*b*, the evaporation vessel 194 may comprise a heater 197 for heating the scrubber bleed from which the solids have been separated. The heater 197 may utilize for example low or medium pressure steam for heating. Preferably, the steam originates from a boiler and/or a steam turbine. The hydrochloric acid vapor having a concentration of 5-22 wt-%, for example of 15-22 wt-% may be let out from the evaporation vessel 194 via line 195. Excess water 198 resulting from the pre-concentration process may be conveyed to first scrubber 102 and/or back to the evaporation vessel 194 as illustrated by dashed lines in FIG. 1*b*. The pre-concentration process further produces a contaminant concentrate 199 that may be expelled from the evaporation vessel 194.

The hydrochloric acid vapor obtained via line 195 may be condensed, and the heat thus released may be utilized for example for heating the boiler feedwater, for district heating and/or for drying of the fuel to be combusted.

Since pure water is utilized to form the scrubbing liquid, the scrubbing liquid strengthens to substantially pure dilute hydrochloric acid, which may be usable as such in many processes. The purity of the dilute hydrochloric acid may also be affected by cleaning the flue gases before conveying them into the first scrubber, as will be detailed below. Moreover, in an embodiment, no scrubbing chemicals are added to the scrubbing liquid. In some prior art solutions, alkali, such as ionic salts of sodium (Na), potassium (K), magnesium (Mg) or calcium (Ca), have been used to improve the absorption of chlorine to a scrubbing liquid. However, having alkali mixed in the scrubbing liquid prevents utilization of the scrubbing liquid as such as hydrochloric acid. Therefore, in an embodiment, the scrubbing liquid within the first scrubber comprises at most 1 wt-% in total of sodium (Na), potassium (K), magnesium (Mg) or calcium (Ca).

Figure 2:
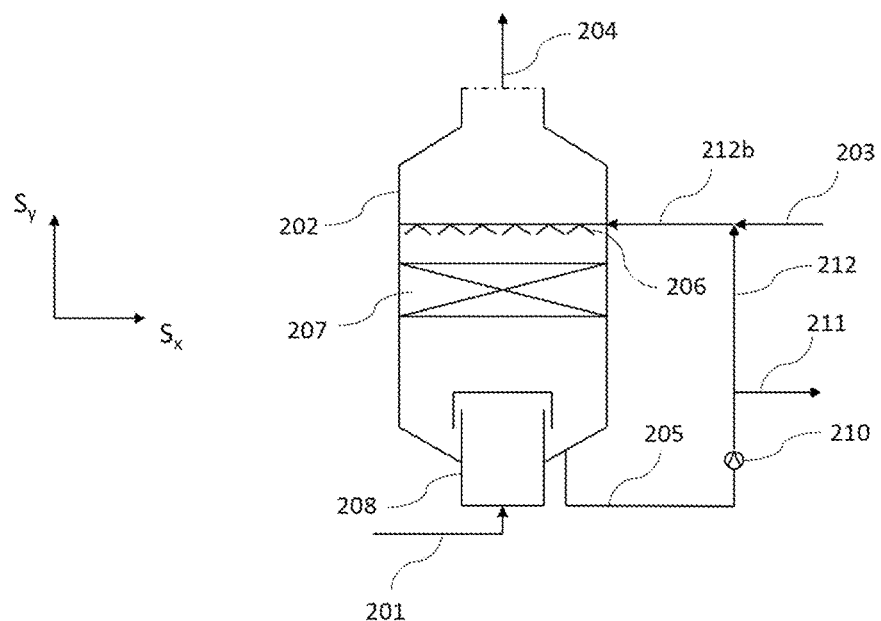
FIG. 2 illustrates, by way of an example, a process diagram of a first scrubber of a system configured to produce aqueous hydrochloric acid from flue gases.

FIG. 2 shows an exemplary first scrubber 202 of a system for producing aqueous hydrochloric acid from flue gases. In addition to the above presented components of the first scrubber of a system 100, the first scrubber 202 comprises means for circulating the scrubbing liquid and nozzles 206 configured to spray the scrubbing liquid onto the gas containing chlorides. The means and the nozzles form a first washing stage. The first scrubber 202 comprises a packed bed column 207 as the contact area for contacting the scrubbing liquid and the flue gas containing chlorides. The first scrubber 202 comprises a pump 210 arranged to pump some of the dilute hydrochloric acid from the first scrubber 202 via lines 212 and 212*b* back into the first scrubber 202. The pump 210 and the lines 212, 212*b* form the aforementioned means for circulating the scrubbing liquid. The pump 210 is arranged to pump the remaining portion of the dilute hydrochloric acid via line 211 for further use, for example into a storage tank (not shown) and/or into a solids separator. In addition to or alternatively, another storage tank (not shown) may be arranged in between the pump 210 and the first scrubber 202, at least if the scrubber 202 does not act as a storage for the circulated scrubbing liquid. Moreover, a first line 205 may serve as the other storage tank.

Figure 1C:
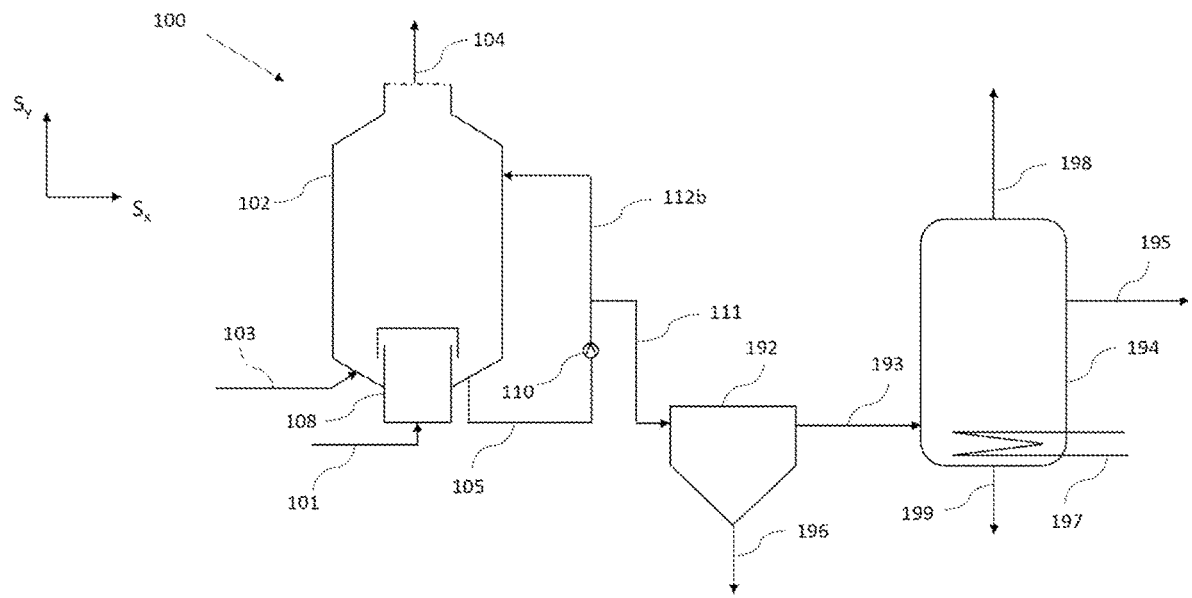
FIG. 1c illustrates, by way of an example, a process diagram of a system 100 configured to produce aqueous hydrochloric acid from flue gases.

FIG. 1*c* illustrates an exemplary process diagram of a system 100 configured to produce aqueous hydrochloric acid from flue gases, wherein the first scrubber 102 comprises means for circulating the scrubbing liquid. The first scrubber 102 comprises a pump 110 arranged to pump some of the dilute hydrochloric acid from the first scrubber 102 via line 112*b* back into the first scrubber. The pump 110 is arranged to pump the remaining portion of the dilute hydrochloric acid via line 111 into a solids separator 192.

With reference to FIG. 2 in a corresponding method according to an embodiment, the flue gas containing chlorides is provided into the first scrubber 202 via the first conduit 201 and a connection 208. Water is conveyed via the second conduit 203 to be mixed with the scrubbing liquid in the line 212*b*. The scrubbing liquid comprising the water is conveyed to the first scrubber 202 via line 212*b*. In this way, the water is used in a scrubbing liquid in the first scrubber 202. The flue gas containing chlorides is scrubbed with the scrubbing liquid by contacting the flue gas with the scrubbing liquid in the first scrubber 202. The contacting of the flue gas and the scrubbing liquid preferably takes place in the contact area of the first scrubber 202. The contact area may be for example a packed bed column 207. When contacted with the scrubbing liquid, at least some of the chlorides contained by the flue gas are transferred into the scrubbing liquid. Thus, dilute hydrochloric acid is produced. At least some of the dilute hydrochloric acid is let out from the first scrubber 202 as a scrubber bleed. The dilute hydrochloric acid is let out via first line 205. A concentration of the dilute hydrochloric acid in the first scrubber 202 is maintained at a concentration of at most 20 wt-%. The concentration of the dilute hydrochloric acid is maintained by controlling the amount of dilute hydrochloric acid expelled from the first scrubber 202. The flue gas from which at least some of the chlorides are transferred into the scrubbing liquid, referred to as a flue gas derivate 204, is directed out of the first scrubber 202. The flue gas derivate 204 may contain for example oxides of sulphur. Some of the scrubbing liquid from the first scrubber 202 is pumped by a pump 210 via lines 212 and 212*b* back into the first scrubber 202. The pump 210 is arranged to pump the remaining portion of the dilute hydrochloric acid via line 211 for further use, for example into a storage tank and/or into a solids separator. The scrubber bleed taken via line 211 (or from the first scrubber 202) may be pre-concentrated as discussed above in connection with FIG. 1*b*.

Figure 3:
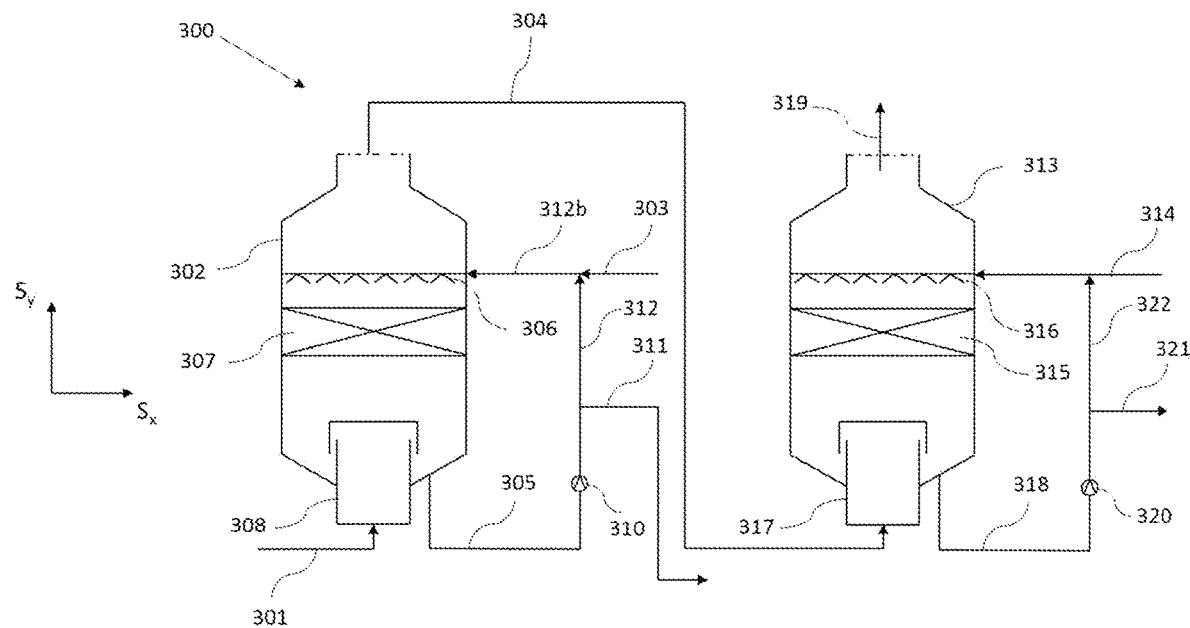
FIG. 3 illustrates, by way of an example, a partial process diagram of a system 300 configured to produce aqueous hydrochloric acid from flue gases and to remove $SO_x$ from the flue gas derivate.

FIG. 3 is a partial illustration of another system 300 for producing aqueous hydrochloric acid from flue gases. In addition to the above presented components, the system 300 comprises a second scrubber 313. The second scrubber 313 is configured to remove at least an oxide or oxides of sulphur ($SO_x$) from the flue gas derivate 304. The second scrubber 313 is configured to receive the flue gas derivate 304 and a secondary scrubbing liquid. A line 314 configured to feed the secondary scrubbing liquid into the second scrubber 313 is shown in the figure. The second scrubber 313 is configured to scrub the flue gas derivate 304 with the secondary scrubbing liquid. Preferably, the secondary scrubbing liquid comprises water and alkali, for example at least one of the following: ionic salt of sodium (Na), potassium (K), magnesium (Mg) and calcium (Ca). The second scrubber 313 is configured to produce spent secondary scrubbing liquid and a second flue gas derivate 319. A line 318 is provided for conveying the spent secondary scrubbing liquid from the second scrubber 313. A second scrubber 313 as indicated above may be used in connection with any of the systems 100, 300, 500 and 600 of FIGS. 1a-c, 3, 5a-b and 6a-b as well as with any of the first scrubbers 202, 402 and 702 of FIGS. 2, 4 and 7. Moreover, scrubber bleed taken via line 311 (or from the first scrubber 302) may be pre-concentrated as discussed above in connection with FIG. 1b.

The second scrubber 313 of FIG. 3 also comprises means for circulating the secondary scrubbing liquid, nozzles 316 configured to spray the secondary scrubbing liquid onto the flue gas derivate 304 and a packed bed column 315 as the contact area for contacting the secondary scrubbing liquid and the flue gas derivate 304. A second pump 320 is arranged to pump some of the spent secondary scrubbing liquid from the second scrubber 313 via line 322 and line 314 back into the second scrubber 313. The second pump 320 may be arranged to pump the remaining portion of the spent secondary scrubbing liquid via line 321 for example for recycling or disposal, or for use as industrial raw material. For example, whereupon the secondary scrubbing liquid comprises ionic salt of calcium as the alkali, the spent secondary scrubbing liquid comprises gypsum (calcium sulphate dihydrate, $CaSO_4.2H_2O$) that may be used in gypsum plate production. Thus, in an embodiment, the secondary scrubbing liquid comprises water and an ionic salt of calcium.

With reference to FIG. 3 in a corresponding method according to an embodiment, the flue gas containing chlorides is provided into the first scrubber 302 via the first conduit 301 and a connection 308. Water is conveyed via the second conduit 303 to be used in the scrubbing liquid of the first scrubber 302. The water is mixed with circulating scrubbing liquid and conveyed in the line 312b into the first scrubber 302. The flue gas containing chlorides is scrubbed with the scrubbing liquid by contacting the flue gas with the scrubbing liquid in the first scrubber 302. The contacting of the flue gas and the scrubbing liquid preferably takes place in the contact area of the first scrubber 302. The contact area may be for example a packed bed column 307, as illustrated in FIG. 3. When contacted with the scrubbing liquid, at least some of the chlorides contained by the flue gas are transferred into the scrubbing liquid. Thus, dilute hydrochloric acid is produced. Some of the dilute hydrochloric acid is let out from the first scrubber 302. The dilute hydrochloric acid is let out via first line 305. A concentration of the dilute hydrochloric acid in the first scrubber 302 is maintained at a concentration of at most 20 wt-%. The concentration of the dilute hydrochloric acid is maintained by controlling the amount of dilute hydrochloric acid expelled from the first scrubber 302. The flue gas from which at least some of the chlorides are transferred into the scrubbing liquid, referred to as a flue gas derivate 304, is directed out of the first scrubber 302. The flue gas derivate 304 contains for example oxides of sulphur. Some of the dilute hydrochloric acid from the first scrubber 302 may be pumped by a first pump 310 via lines 312 and 312b back into the first scrubber 302. The first pump 310 is arranged to pump the remaining portion of the dilute hydrochloric acid via line 311 for further use, for example into a storage tank and/or into a solids separator.

The flue gas derivate 304 is directed into a second scrubber 313 via a connection 317. Some secondary scrubbing liquid is conveyed to the second scrubber 313 via line 314. The flue gas derivate 304 is scrubbed with the secondary scrubbing liquid by contacting the flue gas derivate 304 with the secondary scrubbing liquid in the second scrubber 313. Contacting of the flue gas derivate 304 and the secondary scrubbing liquid preferably takes place in the contact area of the second scrubber 313. The contact area may be for example a packed bed column 315. When contacted with the secondary scrubbing liquid, at least some of the oxides of sulphur contained by the flue gas derivate 304 are transferred into the secondary scrubbing liquid, thus forming a spent secondary scrubbing liquid. The spent secondary scrubbing liquid may be let out from the second scrubber 313 via line 318. Some of the spent secondary scrubbing liquid from the second scrubber 313 may be pumped by a second pump 320 via line 322 and line 314 back into the second scrubber 313. The second pump 320 may be arranged to pump the spent secondary scrubbing liquid via line 321 for example for recycling or disposal, or for use as an industrial raw material.

Figure 4:
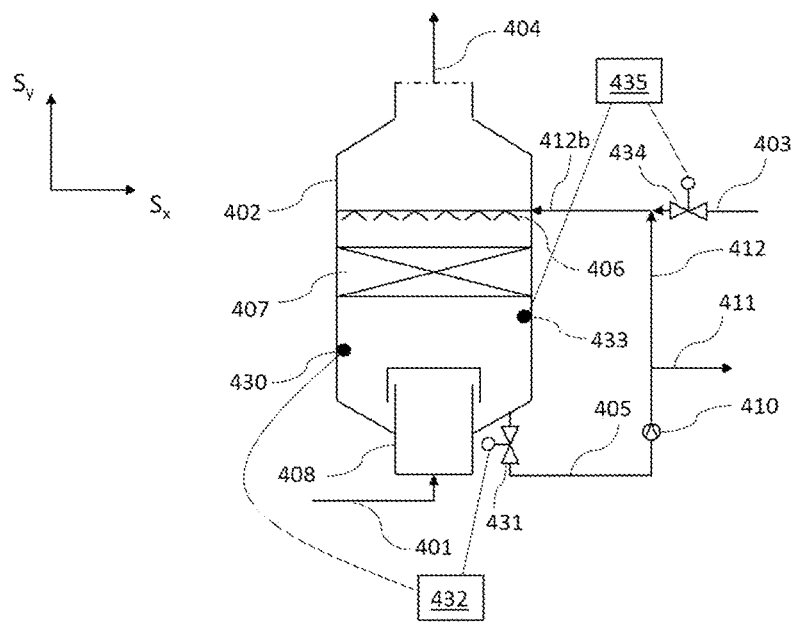
FIG. 4 illustrates, by way of an example, a process diagram of a first scrubber of a system configured to produce aqueous hydrochloric acid from flue gases, the scrubber being configured to control the concentration of the dilute hydrochloric acid.

FIG. 4 presents yet another exemplary embodiment of a first scrubber 402 for producing aqueous hydrochloric acid from flue gases. In addition to the above presented components, the first scrubber 402 comprises a first sensor 430 for determining a concentration of the dilute hydrochloric acid in the first scrubber 402. The system also comprises a first valve 431 for controlling an amount of dilute hydrochloric acid expelled from the first scrubber 402 via the first line 405, and a first processor 432 configured to control the first valve 431 using a signal received from the first sensor 430.

The first scrubber 402 may also comprise a second sensor 433 for determining an amount of scrubbing liquid in the first scrubber 402 and a second valve 434 for controlling an inflow of the water to the first scrubber 402, and a second processor 435 configured to control the second valve 434 using a signal received from the second sensor 433.

The first and second processors 432 and 435 may be separate units, as illustrated in FIG. 4, or they may be comprised by a single processor arrangement. Thus, the first processor 432 may be configured to control also the second valve 434 using a signal received from the second sensor 433. The location of the first sensor 430 and the second sensor 433 illustrated in FIG. 4 is only exemplary. The first sensor 430 may be located in such a way that, in use, a contact with the dilute hydrochloric acid produced is enabled. The second sensor 433 may be located in such a way that, in use, determining a height of a liquid level of the dilute hydrochloric acid produced is enabled. The scrubber bleed taken via line 411 (or from the first scrubber 402) may be pre-concentrated as discussed above in connection with FIG. 1b.

Even if not shown in FIGS. 1a-c, 2, 3, 5a-b, 6a-b or 7, such a sensor or sensors and a valve or valves and a processor or processors may be used also in those embodiments. Further, evaporation vessel 194, 594 and/or line 195, 595 of FIGS. 1b, 1c and 5b may comprise sensor(s), valve(s) and/or processor(s) for controlling the pre-concentration process.

Figure 5A:
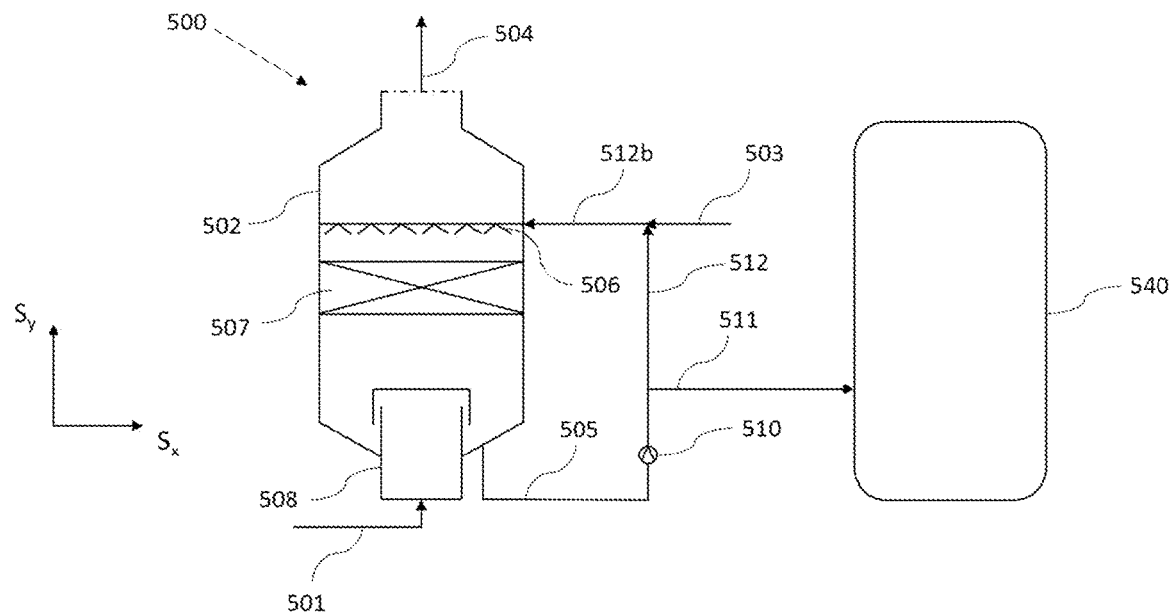
FIG. 5a illustrates, by way of an example, a process diagram of system 500 configured to produce aqueous hydrochloric acid from flue gases and to concentrate the aqueous hydrochloric acid without solids separation and pre-concentration.
Figure 5B:
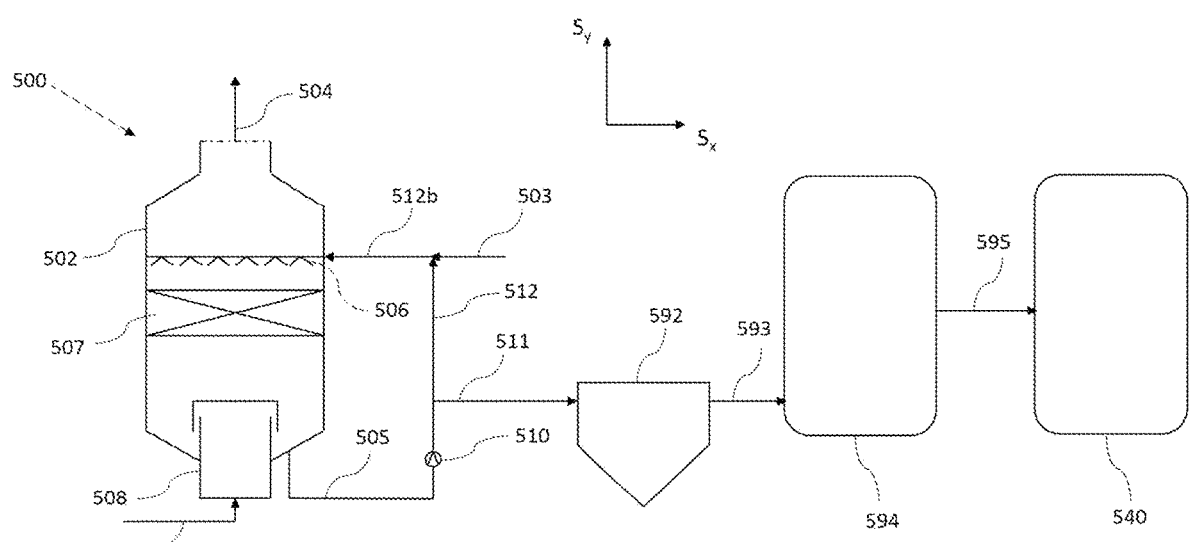
FIG. 5b illustrates, by way of an example, a process diagram of system 500 configured to produce aqueous hydrochloric acid from flue gases and to concentrate the aqueous hydrochloric acid.

FIG. 5a illustrates a system 500, that comprises a concentrator 540 arranged downstream of the first scrubber 502. FIG. 5b illustrates a system 500 comprising a concentrator arranged downstream of the first scrubber 502, the solids separator 592 and the evaporation vessel 594. The hydrochloric acid vapor from the evaporation vessel 594 is introduced into the concentrator 540 through a line 595. At least some of the dilute hydrochloric acid is let out from the first scrubber via first line 505 as a scrubber bleed. The scrubber bleed may be pumped by a pump 510 via line 511 into the a storage tank and/or solids separator 592. The scrubber bleed from which the solids have been separated is conveyed into the evaporation vessel 594. The hydrochloric acid vapor produced in the evaporation vessel is introduced into the concentrator 540 and concentrated in the concentrator 540. By concentrating, over 30 wt-% hydrochloric acid is produced.

The dilute hydrochloric acid having a HCl concentration of 20.2 wt-% forms an azeotrope of HCl and water at atmospheric pressure at about 108° C. In a case the acid concentration is lower than in the azeotropic mixture, the hydrochloric acid may be concentrated only up to the azeotropic point at the atmospheric pressure. For further concentration, special procedures are needed.

The concentrator 540 may be for example an extractive distillation apparatus. The purpose of the system is to suppress the azeotropic point and to increase the relative volatility of HCl. This is accomplished by adding an additive, namely an extractive agent having strong hygroscopic properties. In the process, the extractive agent captures water and enables formation of hydrochloric acid of high concentration. The extractive agent may be freed from water and recycled into the extractive distillation process. Suitable extraction agents represent for example sulphuric acid and concentrated aqueous solutions of metal chlorides, such as $MgCl_2$ and $CaCl_2$.

Alternatively, the concentrator 540 may be represented by a dual-pressure technology. The process takes advantage of the fact that the composition of the azeotropic HCl/water-mixture depends on the pressure. In the process, the azeotropic point is overcome by combining two extractive distillation steps having different pressures. Operation of the two distillation columns operating at different pressures allows one column to operate with a feed stream below the azeotrope (thus removing water from the system), whereas the second column operates with a feed stream above the azeotrope (thus removing the concentrated hydrochloric acid).

In yet another alternative, the concentrator 540 may be an apparatus, wherein the dilute hydrochloric acid is concentrated utilizing HCl produced by burning chlorine ($Cl_2$) with hydrogen.

Hydrochloric acid is typically produced in solutions up to 38 wt-% HCl. Higher concentrations up to just over 40 wt-% are practically possible, however, the evaporation rate at these concentrations is so high that storage and handling require extra precautions, such as pressurization and cooling. Bulk industrial grade hydrochloric acid therefore has a concentration between 30 to 38 wt-%, being optimized to balance transport efficiency and product loss through evaporation. Hydrochloric acid may be used in many industrial processes such as refining metal. One of the most important applications of hydrochloric acid is in pickling of steel, to remove rust or iron oxide from iron or steel before subsequent processing. Another major use of hydrochloric acid is in the production of organic compounds. Further, numerous products can be produced with hydrochloric acid in acid-base reactions, resulting in inorganic compounds. Hydrochloric acid also finds use in a large number of small-scale applications, such as leather processing, purification of common salt, household cleaning, building construction and even in the food industry.

Figure 6A:
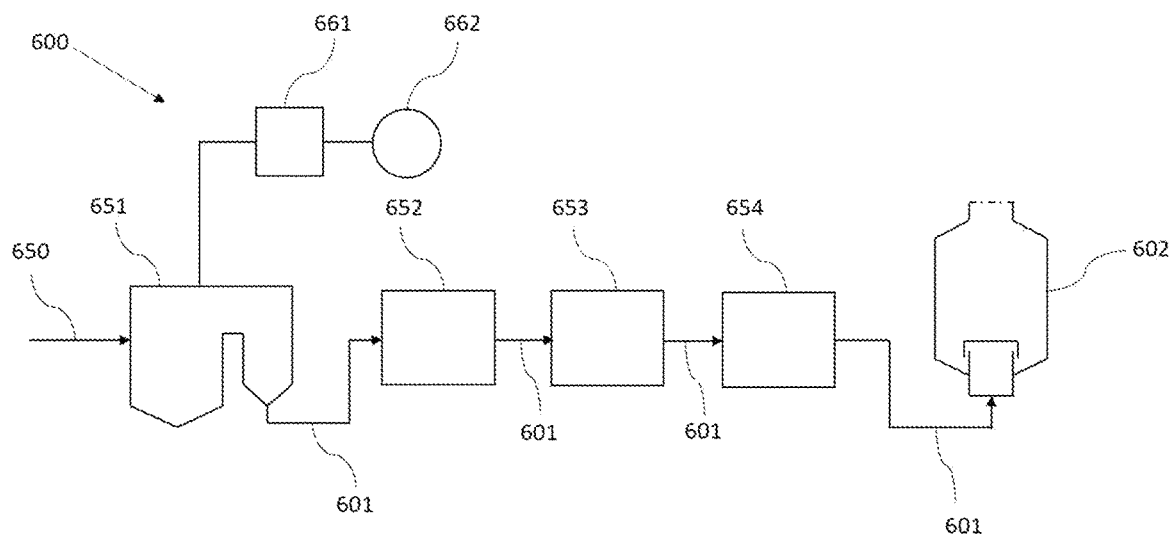
FIG. 6a illustrates, by way of an example, a process diagram of system 600 configured to produce aqueous hydrochloric acid from flue gases resulting from a boiler without solids separation and pre-concentration.

FIG. 6a shows an exemplary schematic diagram of a system 600 for producing aqueous hydrochloric acid from flue gases without solids separation and pre-concentration. The flue gas containing chlorides is produced in a boiler 651 by burning fuel 650. The boiler 651 may be configured to burn fuel 650 that is supplied in solid form, preferably in pulverized form. According to an embodiment, and as illustrated in FIG. 6, prior to providing the flue gas containing chlorides into the first scrubber 602 the flue gas may be cooled with a heat exchanger 653 arranged in the first conduit 601. In consequence of the cooling, the temperature of the flue gas is typically reduced to 150-200° C. The heat exchanger 653 is configured to recover heat from the flue gas containing chlorides to a heat exchange medium, such as water and/or steam. A superheater or an economizer of the boiler 651 may serve as the heat exchanger 653. The heat exchanger (653, 651) has the technical effect of lowering the temperature of the flue gas to a level that is tolerable by a typical particle separating unit 654. Therefore, preferably, the heat exchanger 653 is arranged, in a direction of flow of the flue gas, in between the boiler 651 and a particle separating unit 654. This has the technical effect of further lowering the temperature of the flue gas prior to the particle separating unit 654. Lowering the temperature sufficiently may condense some gaseous compounds to liquid substances, and in this way the cooling provided by the heat exchanger 653 may improve the efficiency of cleaning the flue gas. More preferably, the heat exchanger 653 is arranged, in a direction of flow of the flue gas, in between a catalytic reduction reactor 652 and a particle separating unit 654. Direction of flow of the flue gas refers to a direction from the boiler 651 to the first scrubber 602. This has also other effect as detailed below.

In addition, the boiler 651 comprises a heat exchanger, such as a superheater or an economizer. A heat exchanger of the boiler 651 is also configured to recover heat from the flue gas containing chlorides to a heat exchange medium, such as water and/or steam. A heat exchanger of the boiler 651 may be configured to feed steam into a steam turbine 661 that produces mechanical energy for a generator 662. The generator 662 is configured to transform the mechanical energy to electricity. The steam turbine 661 and the generator 662, in combination, form means (661, 662) for producing electricity using the steam obtainable from the boiler 651.

As mentioned above, the low or medium pressure steam originating from the boiler 651 and/or the steam turbine 661 may be used in the heater 197 of the evaporation vessel 194 for heating and thus concentrating the scrubber bleed.

The cooled flue gas may be cleaned by removing particles, such as dust and soot, from the gas. Arranged within the first conduit 601, in between the heat exchanger 653 and the first scrubber 602, may be a particle separating unit 654. The particle separating unit 654 may comprise at least one of the following: a filter and an electrostatic precipitator.

As illustrated in FIG. 6, the system 600 may comprise a catalytic reduction reactor 652 arranged in the first conduit 601 and configured to remove catalytically oxides of nitrogen ($NO_x$) from the flue gas containing chlorides. The catalytic reduction reactor 652 preferably is arranged upstream of the heat exchanger 653. This has the effect that, in order to allow efficient catalytical removal of the oxides of nitrogen from the flue gas, the temperature of the flue gas has to be high enough. Therefore, it is preferable that the heat exchanger 653 is arranged downstream of the catalytic reduction reactor 652 in order not to cool the flue gas unnecessary much before the catalytic reduction.

Purity of the dilute hydrochloric acid produced in the first scrubber 602 may be affected by cleaning the flue gases before conveying them into the first scrubber 602. This improves the versatility of the scrubbing liquid for use as hydrochloric acid in various applications. Furthermore, removal of at least some of the $NO_x$ from the flue gas containing chlorides facilitates the transferral of chlorides into the scrubbing liquid in the first scrubber and in this way increases the efficiency of the process to produce the hydrochloric acid having the concentration of at most 20 wt-%. In this way, the removal of $NO_x$ from the flue gases improves the efficiency of the process for obtaining the hydrochloric acid of the desired concentration. Moreover, introducing pure water into the scrubbing liquid improves the quality of the hydrochloric acid.

Figure 6B:
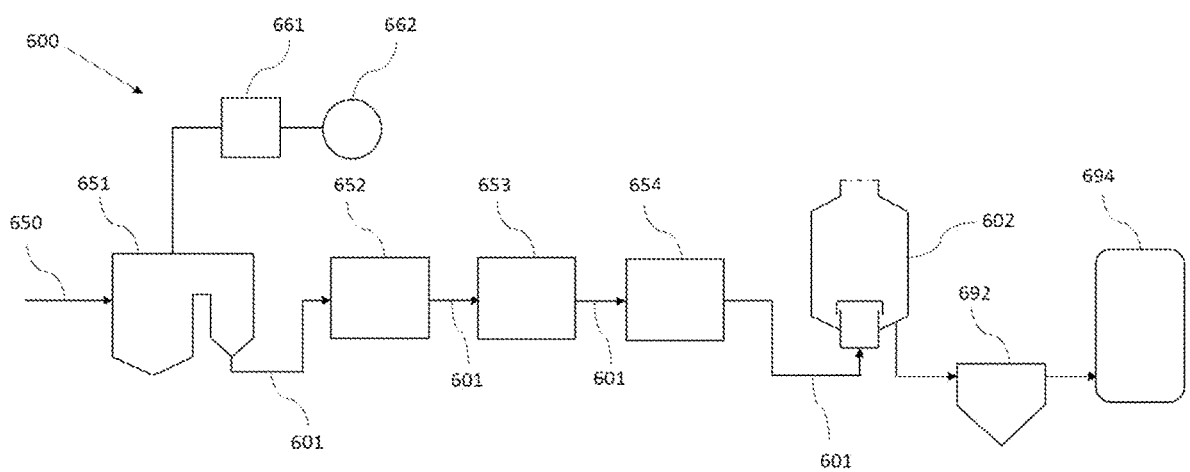
FIG. 6b illustrates, by way of an example, a process diagram of system 600 configured to produce aqueous hydrochloric acid from flue gases resulting from a boiler.

As illustrated by FIG. 6*b*, the system 600 further comprises a solids separator 692 and an evaporation vessel 694 arranged downstream of the first scrubber 602.

As for the fuel used to produce the flue gas containing chlorides, it has been observed that fuels comprising a high amount of chlorine serve the purpose well. Therefore, in a preferable embodiment, wherein the flue gas containing chlorides is produced by burning fuel, the fuel comprises at least 0.005 to 1.2 wt-% chlorine. The process has been found to suit well to a coal combustion process. Thus, in an embodiment, the fuel comprises coal, preferably the fuel comprises at least 50 wt-% coal. As indicated above, the fuel may comprise also other constituents, such as biomass, optionally pre-treated, and/or a gaseous product gas obtained from gasification of biomass. Preferably, the fuel comprises coal and a biomass-based compound (for example gaseous product or a solid compound). When the fuel comprises coal and a solid biomass-based compound, the solid biomass-based compound is preferably ground from pellets.

The following examples illustrate some aspects of the method and/or the system:

1. A method for producing aqueous hydrochloric acid from flue gases is provided. The method comprises
    conveying water to a first scrubber for use in a scrubbing liquid,
    providing flue gas containing chlorides into the first scrubber,
    scrubbing the flue gas containing chlorides with the scrubbing liquid by contacting the flue gas with the scrubbing liquid in the first scrubber, thereby producing dilute hydrochloric acid and a flue gas derivate,
    letting out some of the dilute hydrochloric acid from the first scrubber, and
    maintaining a concentration of the dilute hydrochloric acid in the first scrubber at 10-20 wt-% by controlling the amount of dilute hydrochloric acid let out from the first scrubber.
2. The method of the example 1, further comprising
    circulating the scrubbing liquid within the first scrubber by spraying the circulated scrubbing liquid onto the flue gas containing chlorides.
3. The method of the example 1 or 2, wherein the water comprises at most 1 wt-% impurities; preferably the scrubbing liquid comprises at most 1 wt-% other compounds than water and hydrochloric acid.
4. The method of any of the preceding examples, further comprising
    maintaining a level of the scrubbing liquid in the first scrubber by controlling an amount of the water conveyed to the first scrubber.
5. The method of any of the preceding examples, further comprising
    introducing the dilute hydrochloric acid from the first scrubber into a concentrator arranged downstream of the first scrubber,
    concentrating the dilute hydrochloric acid in the concentrator, to produce hydrochloric acid having a concentration of over 30 wt-%.
6. The method of any of the preceding examples, further comprising
    prior to providing the flue gas containing chlorides into the first scrubber, cooling the flue gas with a heat exchanger and removing particles from the cooled flue gas using a particle separating unit.
7. The method of any of the examples 1-6, further comprising
    removing catalytically nitrogen oxide and/or nitrogen oxides from the flue gas containing chlorides; preferably before cooling of the flue gas containing chlorides with the heat exchanger of example 6.
8. The method of any of the preceding examples, further comprising
    introducing the flue gas derivate from the first scrubber into a second scrubber and
    removing at least sulphur oxide and/or sulphur oxides from the flue gas derivate in the second scrubber.
9. The method of any of the preceding examples, further comprising
    burning fuel to produce the flue gas containing chlorides, wherein the fuel comprises at least one of the following: biomass, coal, and waste; preferably the fuel comprises coal and biomass-based compound.
10. The method of any of the preceding examples, further comprising
    prior to scrubbing, recovering heat from the flue gas containing chlorides to a heat exchange medium, such as water and/or steam, and
    producing electricity using the heat of the heat exchange medium.
11. A system arranged to produce aqueous hydrochloric acid from flue gases is provided. The system comprises
    a first conduit configured to feed flue gas containing chlorides into a first scrubber,
    a second conduit configured to convey water to be used in a scrubbing liquid of the first scrubber,
    a line configured to convey scrubbing liquid comprising the water into the first scrubber and
    a first line for expelling dilute hydrochloric acid from the first scrubber, wherein
    the first scrubber is configured to scrub the flue gas containing chlorides with the scrubbing liquid, the first scrubber thereby being configured to produce dilute hydrochloric acid and a flue gas derivate.
12. The system of the example 11, further comprising
    a first sensor for determining a concentration of the dilute hydrochloric acid in the first scrubber,
    a first valve for controlling an amount of dilute hydrochloric acid expelled from the first scrubber via the first line, and
    a first processor configured to control the first valve using a signal received from the first sensor.
13. The system of the example 11 or 12, further comprising
    a second sensor for determining an amount of scrubbing liquid in the first scrubber, and
    a second valve for controlling an inflow of the water to the first scrubber, wherein
    the system comprises a second processor configured to control the second valve using a signal received from the second sensor or
    the first processor being configured to control the second valve using a signal received from the second sensor.

14. The system of any of the examples 11-13, further comprising
a heat exchanger arranged in the first conduit and configured to recover heat from the flue gas containing chlorides and
within the first conduit, in between the heat exchanger and the first scrubber, a particle separating unit.

15. The system of any of the examples 11-14, further comprising
a catalytic reduction reactor arranged in the first conduit and configured to remove catalytically nitrogen oxide and/or nitrogen oxides from the flue gas containing chlorides; the catalytic reduction reactor preferably being arranged upstream of a heat exchanger.

16. The system of any of the examples 11-15, further comprising
a concentrator arranged downstream of the first scrubber for concentrating the dilute hydrochloric acid to produce hydrochloric acid having a concentration of over 30 wt-%.

17. The system of any of the examples 11-16, further comprising
a boiler configured to burn fuel to produce
a the flue gas containing chlorides and
a steam, and
means for producing electricity using the steam produced in the boiler;
preferably the boiler is configured to burn fuel that is supplied in solid form, preferably in pulverized form.

Many variations of the method and the system will suggest themselves to those skilled in the art in light of the description above. Such obvious variations are within the full intended scope of the appended claims.

The invention claimed is:

1. A method for producing aqueous hydrochloric acid from flue gases, the method comprising the steps of:
conveying water to a first scrubber (102, 202, 302, 402, 502, 602, 702) or to a line (112*b*, 212*b*, 312*b*, 412*b*, 512*b*, 712*b*, 712*c*) to use the water in a scrubbing liquid of the first scrubber, the scrubbing liquid being aqueous hydrochloric acid or water,
providing flue gas containing chlorides into the first scrubber (102, 202, 302, 402, 502, 602, 702),
scrubbing the flue gas containing chlorides with the scrubbing liquid by contacting the flue gas with the scrubbing liquid in the first scrubber (102, 202, 302, 402, 502, 602, 702), thereby producing dilute hydrochloric acid and a flue gas derivate (104, 204, 304, 404, 504, 704), the dilute hydrochloric acid being an aqueous solution of hydrochloric acid, wherein a content of hydrochloric acid is at most 20 wt-%,
letting out at least some of the dilute hydrochloric acid from the first scrubber (102, 202, 302, 402, 502, 602, 702) as a scrubber bleed,
separating solids suspended by the scrubber bleed in a solids separator (192, 592, 692),
conveying the scrubber bleed from the solids separator (192, 592, 692) into an evaporation vessel (194, 594, 694), and
concentrating the scrubber bleed in the evaporation vessel (194, 594, 694) to produce hydrochloric acid vapor having a concentration of 5-22 wt-%.

2. The method according to claim 1, further comprising the step of:
circulating the scrubbing liquid within the first scrubber (102, 202, 302, 402, 502, 602, 702) by spraying the circulated scrubbing liquid onto the flue gas containing chlorides.

3. The method according to claim 1 wherein:
the water comprises at most 1 wt-% impurities.

4. The method according to claim 1 further comprising the step of:
maintaining a level of the scrubbing liquid in the first scrubber (102, 202, 302, 402, 502, 602, 702) by controlling an amount of the water conveyed to the first scrubber (102, 202, 302, 402, 502, 602, 702).

5. The method according to claim 1, further comprising the steps of:
introducing the hydrochloric acid vapor from the evaporation vessel (194, 594, 694) into a concentrator (540), and
concentrating the hydrochloric acid vapor in the concentrator (540), to produce hydrochloric acid having a concentration of over 30 wt-%.

6. The method according to claim 1, further comprising the step of:
prior to providing the flue gas containing chlorides into the first scrubber (102, 202, 302, 402, 502, 602, 702), cooling the flue gas with a heat exchanger (653) and removing particles from the cooled flue gas using a particle separating unit (654).

7. The method according to claim 1, further comprising the step of:
removing catalytically nitrogen oxide and/or nitrogen oxides from the flue gas containing chlorides.

8. The method according to claim 1, further comprising the steps of:
introducing the flue gas derivate (104, 204, 304, 404, 504, 704) from the first scrubber (102, 202, 302, 402, 502, 602, 702) into a second scrubber (313); and
removing at least sulphur oxide and/or sulphur oxides from the flue gas derivate (104, 204, 304, 404, 504, 704) in the second scrubber (313).

9. The method according to claim 1, further comprising the step of:
burning fuel (650) to produce the flue gas containing chlorides,
wherein the fuel (650) comprises at least one of the following: biomass, coal, or waste.

10. The method according to claim 1, further comprising the steps of:
prior to scrubbing, recovering heat from the flue gas containing chlorides to a heat exchange medium, such as water and/or steam, and
producing electricity using the heat of the heat exchange medium.

11. The method according to claim 1, wherein the flue gas containing chlorides is scrubbed with at least one scrubbing liquid by contacting the flue gas with the scrubbing liquid(s) in at least two washing stages.

12. The method according to claim 1, comprising further the steps of:
contacting the flue gas comprising chlorides with a first scrubbing liquid in a first washing stage to scrub the flue gas comprising chlorides,
conveying the scrubbed flue gas from the first washing stage to a second washing stage, and contacting the flue gas comprising chlorides with a second scrubbing liquid in the second washing stage to scrub the flue gas comprising chlorides, wherein:

the first scrubbing liquid has a first content of hydrochloric acid, the second scrubbing liquid has a second content of hydrochloric acid, and the first content of hydrochloric acid is greater than the second content of hydrochloric acid.

13. A system (100, 300, 500, 600) arranged to produce aqueous hydrochloric acid from flue gases, the system comprising:

a first conduit (101, 201, 301, 401, 501, 601, 701) configured to feed flue gas containing chlorides into a first scrubber (102, 202, 302, 402, 502, 602, 702), a second conduit (103, 203, 303, 403, 503, 703) configured to convey water to be used in a scrubbing liquid of the first scrubber (102, 202, 302, 402, 502, 602, 703), a line (112*b*, 212*b*, 312*b*, 412*b*, 512*b*, 712*b*) configured to convey scrubbing liquid comprising the water into the first scrubber (102, 202, 302, 402, 502, 602, 702) and a first line (105, 205, 305, 405, 505, 705) for expelling dilute hydrochloric acid as a scrubber bleed from the first scrubber (102, 202, 302, 402, 502, 602, 702), wherein:

the first scrubber (102, 202, 302, 402, 502, 602, 702) is configured to scrub the flue gas containing chlorides with the scrubbing liquid, the first scrubber (102, 202, 302, 402, 502, 602, 702) thereby being configured to produce the scrubber bleed and a flue gas derivate (104, 204, 304, 404, 504, 704), and the system further comprises:

a solids separator (192, 592, 692) for separating solids suspended by the scrubber bleed, an evaporation vessel (194, 594, 694) comprising a heater (197) for heating the scrubber bleed from which the solids have been separated, and a second line (193, 593) for conveying the scrubber bleed from the solids separator (192, 592, 692) into the evaporation vessel (194, 594, 694), the evaporation vessel (194, 594, 694) being configured to concentrate the scrubber bleed to produce hydrochloric acid vapor having a concentration of 5-22 wt-%.

14. The system according to claim 13, further comprising:

a first sensor (430) for determining a concentration of the dilute hydrochloric acid in the first scrubber (102, 202, 302, 402, 502, 602, 702), a first valve (431) for controlling an amount of dilute hydrochloric acid expelled from the first scrubber (102, 202, 302, 402, 502, 602, 702) via the first line (105, 205, 305, 405, 505, 705), and a first processor (432) configured to control the first valve (431) using a signal received from the first sensor (430).

15. The system according to claim 13, further comprising:

a second sensor (433) for determining an amount of scrubbing liquid in the first scrubber (102, 202, 302, 402, 502, 602, 702), and a second valve (434) for controlling an inflow of the water to the first scrubber (102, 202, 302, 402, 502, 602, 702), wherein either:

the system comprises a second processor (435) configured to control the second valve (434) using a signal received from the second sensor (433) or the first processor (432) is configured to control the second valve (434) using a signal received from the second sensor (433).

16. The system according to claim 13, further comprising:

a heat exchanger (653) arranged in the first conduit (101, 201, 301, 401, 501, 601, 701) and configured to recover heat from the flue gas containing chlorides; and within the first conduit (101, 201, 301, 401, 501, 601, 701), in between the heat exchanger (653) and the first scrubber (102, 202, 302, 402, 502, 602, 702), a particle separating unit (654).

17. The system according to claim 13, further comprising:

a catalytic reduction reactor (652) arranged in the first conduit (101, 201, 301, 401, 501, 601, 701) and configured to remove catalytically nitrogen oxide and/or nitrogen oxides from the flue gas containing chlorides.

18. The system according to claim 13, further comprising:

a concentrator (540) arranged downstream of the first scrubber (102, 202, 302, 402, 502, 602, 702) and the evaporation vessel (194, 594, 694) for concentrating the hydrochloric acid vapor to produce hydrochloric acid having a concentration of over 30 wt-%.

19. The system according to claim 13, further comprising:

a boiler (651) configured to burn fuel to produce the flue gas containing chlorides and steam, and means (661, 662) for producing electricity using the steam produced in the boiler (651).

20. The system according to claim 13, wherein the first scrubber (102, 202, 302, 402, 502, 602, 702) is a multistage scrubber comprising at least two washing stages.

* * * * *